United States Patent [19]

Naka et al.

[11] Patent Number: 5,086,311
[45] Date of Patent: Feb. 4, 1992

[54] PANORAMIC CAMERA

[75] Inventors: Yoji Naka, Tokyo; Akio Ohmiya, Saitama, both of Japan

[73] Assignee: Fuji Photo Film Co., Ltd., Kanagawa, Japan

[21] Appl. No.: 629,631

[22] Filed: Dec. 18, 1990

[30] Foreign Application Priority Data

| Dec. 18, 1989 | [JP] | Japan | 1-145772[U] |
| Dec. 18, 1989 | [JP] | Japan | 1-145773[U] |
| Dec. 18, 1989 | [JP] | Japan | 1-145774[U] |
| Dec. 18, 1989 | [JP] | Japan | 1-145775[U] |
| Dec. 19, 1989 | [JP] | Japan | 1-146258[U] |
| Dec. 19, 1989 | [JP] | Japan | 1-146259[U] |
| Dec. 19, 1989 | [JP] | Japan | 1-146260[U] |
| Dec. 19, 1989 | [JP] | Japan | 1-146261[U] |
| Jun. 8, 1990 | [JP] | Japan | 2-60780[U] |

[51] Int. Cl.$^5$ ............................................. G03B 3/00
[52] U.S. Cl. ................................. 354/195.1; 354/94; 354/106
[58] Field of Search ................... 354/94, 106, 195.1

[56] References Cited

U.S. PATENT DOCUMENTS

5,010,357  4/1991  Misawa .................. 354/195.1 X

Primary Examiner—Michael L. Gellner
Attorney, Agent, or Firm—Young & Thompson

[57] ABSTRACT

A panoramic camera has masking plates selectively movable for masking the exposure aperture so as to form a picture frame of a panoramic size or for opening the whole exposure aperture. A plate actuating mechanism provided on the fixed lens mount selectively sets the masking plates in either the full size position or the panoramic position. According to a preferred embodiment, the camera has a taking lens of the collapsible mount type having movable and fixed lens mounts. A guide groove formed on the movable lens mount engages with a pin formed on an operating knob upon retracting the movable lens mount into the fixed lens mount. The masking plates are thereby retracted from the path of the movable lens mount. The camera includes spring members for biasing the masking plates toward the full size position. An indicator indicates the frame size upon operating the operating knob. The operating knob is arranged in a film passageway for operating the plate actuating mechanism. The frame size is thereby prevented from changing until unloading the film. Two recesses corresponding to the two frame sizes are provided in a slide lever portion formed on the operating knob. A positioning projection formed on the back door engages with either of the arresting recesses so as to keep the slide lever portion at the position of the selected frame size. The camera further includes a mechanism for recording predetermined data on a portion of the film masked by the masking plates.

31 Claims, 9 Drawing Sheets

PANORAMIC CAMERA

BACKGROUND OF THE INVENTION

The present invention relates to a photographic camera, more particularly to a panoramic camera changeable as to the picture frame size between full or normal size, on the one hand, and panoramic size on the other hand.

Cameras with which photographs can be taken with great ease are in widespread use as compact cameras having an autofocus device and a vari-focal lens for the taking lens which can be changed as to focal length between telephotography and wide angle photography without exchanging the taking lens. In such a compact camera, 35 mm roll film is generally used with the picture frame size set at full size (24 mm×36 mm) or half size (24 mm×17.5 mm), i.e. the full size divided in half. Some recent cameras have had a picture frame of panoramic size (16 mm×36 mm), i.e. the full size with upper and lower horizontal portions cut off in order to make more interesting pictures or to serve specialized purposes. It is desirable that not only panoramic photography but also full size photography can be selectively carried out with the same camera.

In order to select either full size photography and panoramic photography, a mechanism must be arranged to change over the size of the picture frame. But the size of compact cameras must be small so that they will be portable. There exists a vari-focal compact camera of the collapsible lens mount type, in which a movable lens mount of the taking lens can be set selectively in the telephotographic or wide angle photographic position for use in taking photographs, and can thereafter be collapsed from the wide angle photographic position for carrying the camera. If such a camera has a frame size changeover mechanism, there is a problem in that the frame size changeover mechanism obstructs the collapsing space of the retracted movable lens mount.

If a change is made between full size photography and panoramic photography before the end of the roll of film in a camera capable of selecting either full size photography or panoramic photography, the two different sizes of picture frame successively appear in the image frames recorded on the roll film. This raises a problem of complexity and low efficiency in printing the film.

Furthermore, in the case of panoramic photography with a camera having a panoramic function, no image is recorded on the film in the upper and lower portions of the image frame covered by the frame size changeover mechanism, which are thus useless. Although panoramic photography may be carried out for a specialized use, the film on which the image is recorded carries no desired data such as the place, the position, the camera angle, comments, the photographer's name, and the date.

OBJECTS OF THE INVENTION

It is therefore an object of the present invention to provide a camera in which photographs can be taken selectively of full size or panoramic size.

It is another object of the present invention to provide a camera changeable between panoramic size and full size with a simple construction.

It is a further object of the present invention to provide a camera changeable for panoramic photography by collapsing a movable lens mount into a fixed lens mount.

It is yet another object of the present invention to provide a panoramic camera for preventing two different frame sizes from appearing among the exposed image frames on one strip of film.

It is a still further object of the present invention to provide a panoramic camera for making use of the portions of film that are unexposed during panoramic photography.

SUMMARY OF THE INVENTION

In order to achieve the above and other objects and advantages of this invention, a photographic camera according to the invention comprises: a rectangular exposure aperture for forming a picture frame of the full size; masking means for partly masking the exposure aperture so as to form a picture frame of a vertically narrow panoramic size when set at a panoramic position and for opening the whole exposure aperture when set at a full size position; actuating means for setting the masking means at either the full size position or the panoramic position; and manual operating means for operating the actuating means.

According to a preferred embodiment, the camera further comprises: a taking lens assembly having a movable lens mount and a fixed lens mount in which the movable lens mount is to be substantially contained; engagement means formed integrally with the manual operating means; and an engagement portion formed on the movable lens mount for engaging with the engagement means upon containing the movable lens mount in the fixed lens mount so as to set the masking means at the panoramic position. The camera includes spring members for biasing masking plates constituting the masking means toward the full size position. In the camera, the actuating means is provided on the fixed lens mount.

The camera includes means for indicating the size of the picture frame upon operating the manual operating means. In the camera, the manual operating means is arranged in a passageway of film to be loaded into the camera body. The camera includes: a slide lever portion provided slidably along a back door of the camera body for being operated by the manual operating means; arresting means formed on the slide lever portion for the full size position and for the panoramic position; and positioning means formed on the back door for engaging with either of the arresting means upon closing the back door so as to prevent the slide lever portion from sliding.

The camera includes means for recording predetermined data on film loaded in a camera body on a portion masked by the masking means.

As the camera according to the present invention is provided with masking means for partly masking the exposure aperture and actuating means for setting the masking means at either position corresponding to different frame sizes, photographs can be taken with a camera of simple construction at either full size and panoramic size. As the camera is provided with engagement means and an engagement portion to be engaged together between manual operating means and a movable lens mount, the movable lens mount can be collapsed into the fixed lens mount, irrespective of the extant position of the masking means. As the manual operating means is arranged in the film passageway to prevent the frame size from being changed over, and as positioning means prevents a slide lever portion from sliding to lock the selected frame size, the different frame sizes are prevented from appearing among the exposed image frames on one strip of film. Furthermore, as the camera has data recording means, predetermined data can be recorded on the film on the unexposed portion which is thus put to good use.

BRIEF DESCRIPTION OF THE DRAWINGS

The above and other objects and advantages of the present invention will become more apparent from the following detailed description when read in connection with the accompanying drawings, in which:

FIGS. 3A and 3B are side views schematically illustrating a mechanism for actuating masking plates illustrated in FIG. 2; FIG. 3A illustrates the full size position, and FIG. 3B illustrates the panoramic position;

FIGS. 9A and 9B are plan views illustrating film exposed in the camera of FIG. 1; FIG. 9A illustrates panoramic size frames, and FIG. 9B illustrates full size frames;

DETAILED DESCRIPTION OF THE PREFERRED EMBODIMENTS

Figure 1:
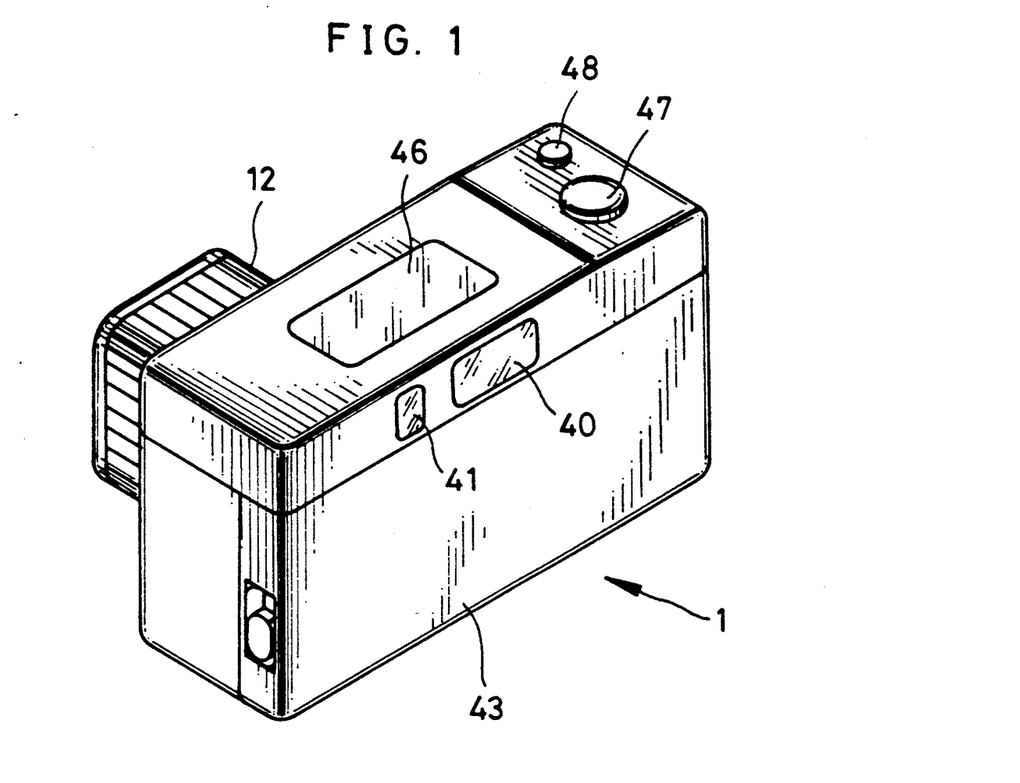
FIG. 1 is a perspective view schematically illustrating a panoramic camera observed from behind according to a preferred embodiment of the present invention.

In FIG. 1 illustrating a panoramic camera 1 in accordance with a preferred embodiment observed from behind, the rear surface of the camera 1 provided with a back door 43 has a viewfinder 40 for observing a subject to be taken and an indicator window 41 for indicating the setting for full size photography or panoramic photography. Reference numeral 12 designates a movable lens barrel for supporting a front lens group of a taking lens. The camera body is provided on the right end of the upper surface with a shutter button 47 for releasing the shutter of the camera 1 and a selector button 48 for changing over the focal length of the taking lens. The upper surface of the camera body has a liquid crystal display (LCD) 46 for indicating various kinds of information useful in photography.

Figure 2:
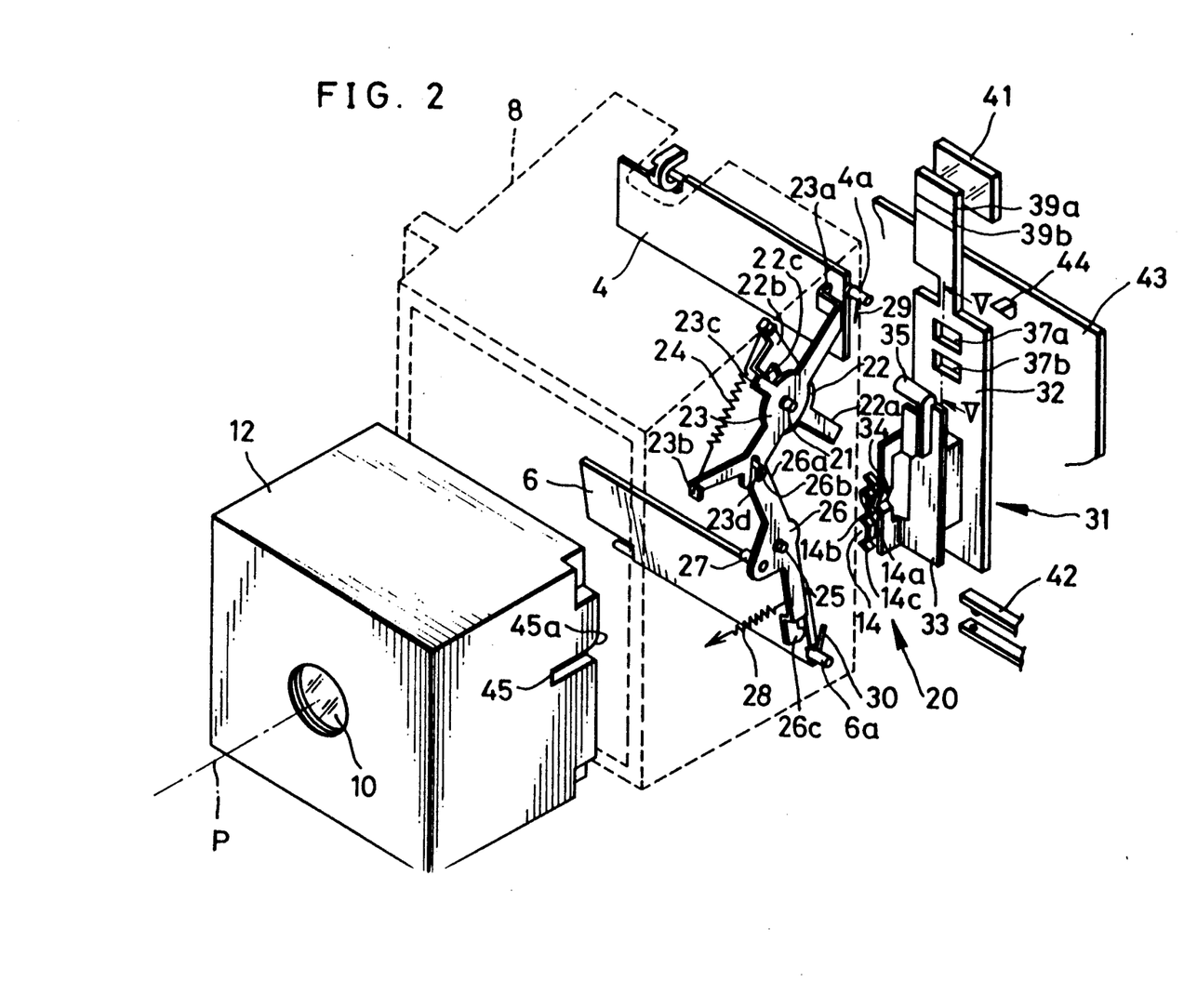
FIG. 2 is an exploded perspective view schematically illustrating the panoramic camera in FIG. 1.
Figures 3A, 3B:
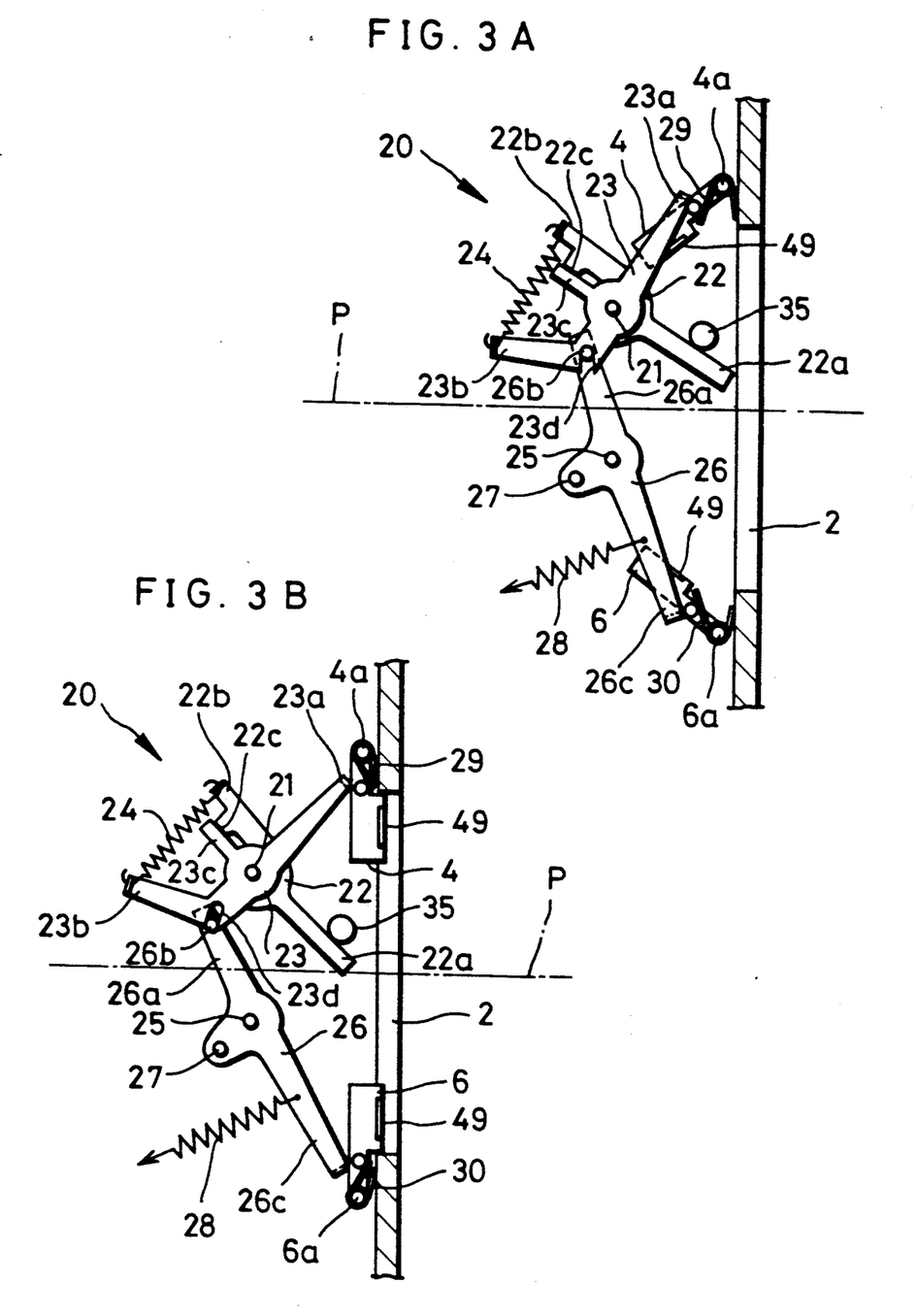
Figure 6:
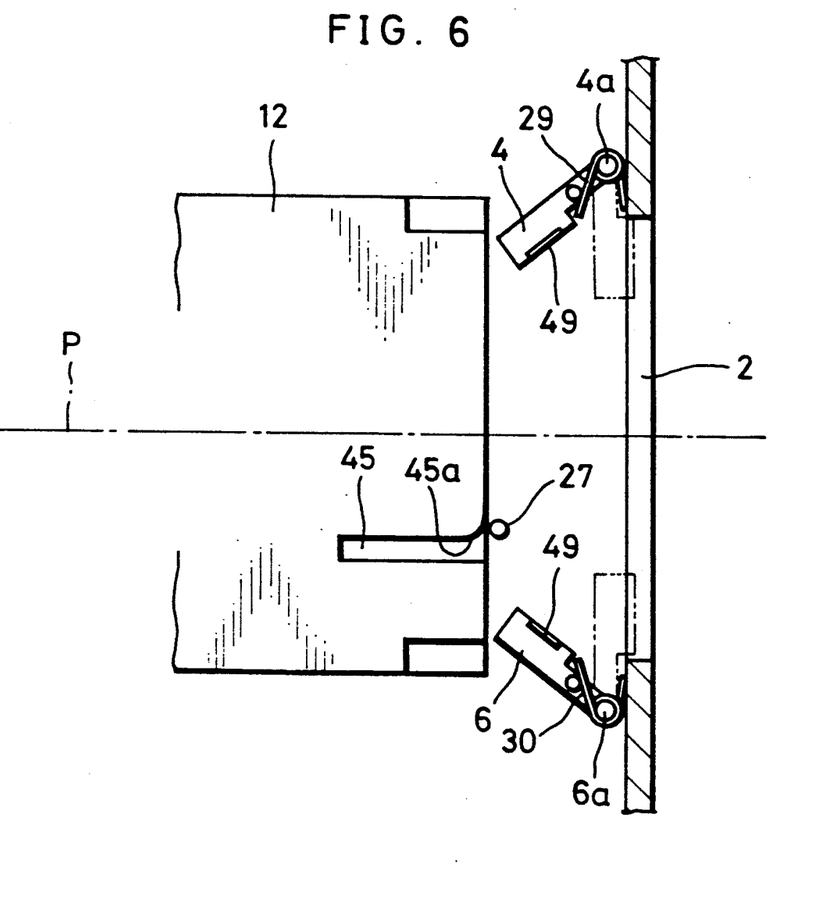
FIG. 6 is a side view illustrating the relationship between the movable lens mount and the masking plates illustrated in FIG. 2 in the full size position.

In FIG. 2 schematically illustrating the structure of the camera 1, upper and lower masking plates 4 and 6 are supported by a fixed lens mount 8 for pivotal movement about shafts 4a and 6a each parallel to upper and lower edges of an exposure aperture 2 illustrated in FIGS. 3A, 3B and 6. The swinging of the masking plates 4 and 6 covers partly the exposure aperture 2 without leaving space between the masking plates 4 and 6 and the edges of the exposure aperture 2, thereby to change the frame size from the uncovered full size to panoramic size.

The fixed lens mount 8 is fixed on the camera body and has a rear lens group (not shown) as a fixed lens component mounted therein. The fixed lens mount 8 slidably supports the movable lens mount 12 with the front lens group 10 as a movable lens component movable in the direction of the optical axis P relative to the fixed lens mount 8 for changing over the focal length of the taking lens. As is well known, there is disposed in the fixed lens mount 8 a converter lens (not shown) swingable in a direction perpendicular to the optical axis P of the taking lens. When the movable lens mount 12 advances to the telephotographic position, the converter lens is inserted ion the optical axis P and the taking lens is thus in the telephotographic condition.

The movable lens mount 12 is adapted to be set in one of three positions, i.e. the telephotographic position wherein the movable lens mount 12 is advanced from the fixed lens mount 8 for telephotography, the wide angle photographic position more rearward than the telephotographic position, for wide angle photography, and the collapsed position wherein the movable lens mount 12 is retracted into the fixed lens mount 8 further rearward than the wide angle photographic position. It is to be noted that panoramic photography as well as full size photography can be carried out in either of the telephotography and wide angle photography modes. The movable lens mount 12 is set at the telephotographic or wide angle photographic position by operating the selector button 48, and is retracted to the collapsed position upon closing a lens barrier (not shown) by operating a lens barrier button (not shown).

A plate actuating mechanism 20 for actuating the masking plates 4 and 6 is provided on the lateral and rear sides of the fixed lens mount 8. In the upper part of the lateral surface of the fixed lens mount 8, a drive lever 22 is supported rotatably at its middle on a shaft 21. The middle of an upper lever 23 is supported on the same shaft 21 for rotating the upper masking plate 4.

The rear end 22a of the drive lever 22 extends toward the exposure aperture 2, while the front end 22b of the drive lever 22 extends in the forward direction, and has a contact portion 22c formed thereon. The rear end 23a of the upper lever 23 is in contact with the front surface of the upper masking plate 4, while its front end 23b extends forward. A tension spring acting as a charging spring 24 is connected between the front end 23b of the upper lever 23 and the front end 22b of the drive lever 22, and exerts a biasing force to urge the front end 22b of the driver lever 22 toward the front end 23b of the upper lever 23. The contact position 22c of the drive lever 22 is in contact with a tongue 23c extending from the upper lever 23.

A groove 23d is formed on the upper lever 23 between the shaft 21 and the front end 23b. In the lower portion of the lateral surface of the fixed lens mount 8, a lower lever 26 is supported rotatably at its middle on a shaft 25. A pin 26b formed on the upper end 26a of the lower lever 26 is inserted in the groove 23d. The lower end 26c of the lower lever 26 is in contact with the front surface of the lower masking plate 6. A pin 27 acting as an engagement means is formed on the lower lever 26 at a position spaced from the shaft 25. A tension spring acting as a restoration spring 28 is connected between the fixed lens mount 8 and the lower lever 26 midway between the shaft 25 and the lower end 26c of the lower lever 26. The restoration spring 28 exerts a biasing force that acts to rotate the lower lever 26 to detach the lower end 26c of the lower lever 26 from the lower masking plate 6.

Torsion springs 29 and 30 are fitted on the respective shafts 4a and 6a of masking plates 4 and 6, and exert a biasing force that acts to swing the masking plates 4 and 6 open, that is, to the position for full size photography.

An operating member 31 is provided on the back of the fixed lens mount 8 and is slidable in the vertical direction inside the back door 43, and consists of a slide lever portion 32 and a coupling portion 33. The lateral side of the coupling portion 33 is bent forward. The bent portion has an engagement projection 34 formed on its middle for engaging with an arresting portion 14 formed on the camera body. The arresting portion 14 has a plurality of notches each adapted to engage with the engagement projection 34; i.e. an F-notch 14a located approximately for full size photography, and a P-notch 14b located below 14a for panoramic photography. The bent portion having the engagement projection 34 has resilience so as to make the engagement reliable in accordance with the position to which the operating member 31 is slid.

Figure 4:
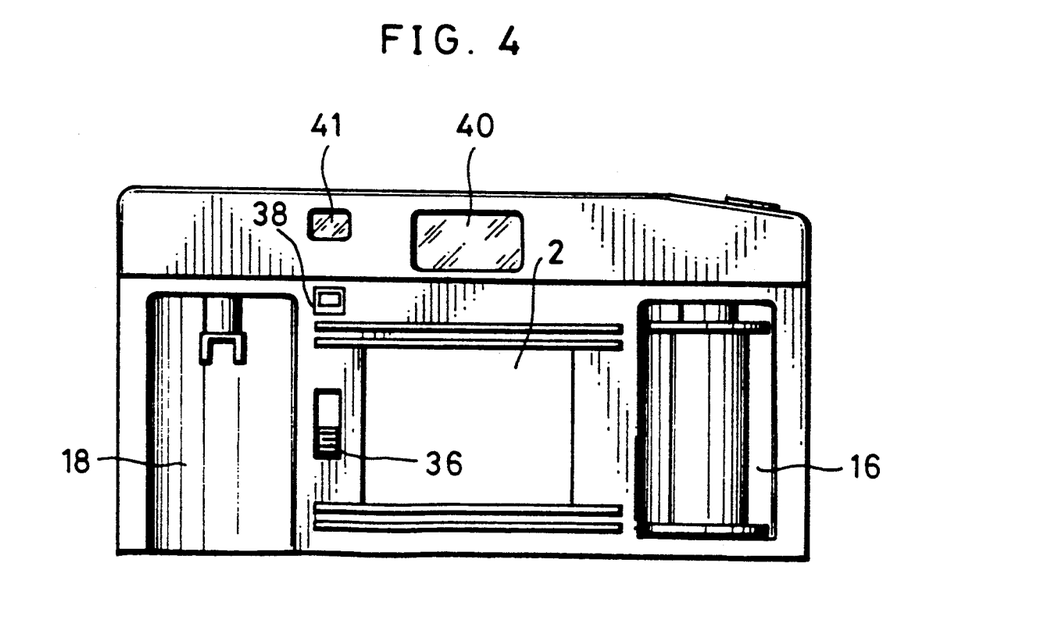
FIG. 4 is a rear elevation showing the camera of FIG. 1 with the back door removed.

The rear surface of the slide lever portion 32 is provided with an operating knob 36 seen in FIG. 4, which shows the camera body without the back door 43. The panoramic photography mode is selected by sliding the operating knob 36 upwardly. The full size photography mode is selected when the operating knob 36 is slid downwardly. The operating knob 36 is located on the rear surface of the camera body and in the passageway through which film is transported. When the film is loaded and advanced, the operating knob 36 is covered by the loaded film. Two arresting recesses 37a and 37b are formed in the upper part of the slide lever portion 32, the upper recess acting as a P-recess 37a for panoramic photography, and the lower recess acting as an F-recess 37b for full size photography. The sliding movement of the operating member 31 serves to locate the selected one of the arresting recesses 37a and 37b in registry with an opening 38, as illustrated in FIG. 4, formed in the rear surface of the camera body and above the film passageway. Two indicia 39a and 39b are arranged at the top of the slide lever portion 32, an upper one of these indicia acting as a P-indicium 39a for panoramic photography, and the lower indicium acting as an F-indicium 39b for full size photography. The sliding of the operating member 31 serves to locate the indicia 39a and 39b selectively in registry with a display window 41 on the back of the camera as illustrated in FIGS. 1 and 4. The rear surfaces of the P- and F-indicia 39a and 39b preferably carry the legends PANORAMA and FULL SIZE, but may instead each bear only a different color.

Figure 5:
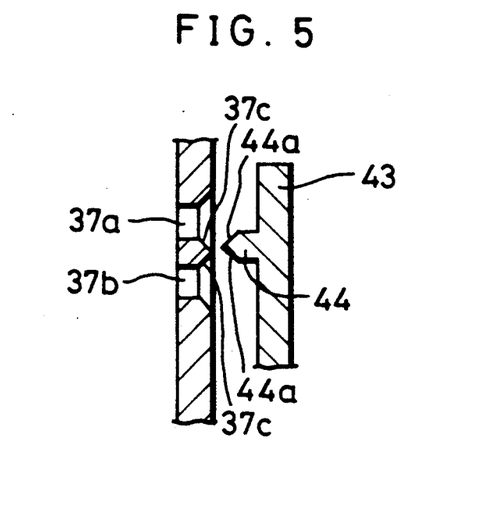
FIG. 5 is a sectional view taken on line V—V in FIG. 2, illustrating the relationship between the back door and a slide lever portion.

The arresting portion 14 for arresting the engagement projection 34 is additionally provided with an E-notch 14c. When the operating member 31 is further slid downwardly from the P-notch 14b engaging with the engagement projection 34, the E-notch 14c engages with the engagement projection 34. A switch 42 is arranged below the coupling portion 33 and is closed upon the engagement of the engagement projection 34 with the E-notch 14c. As illustrated in FIGS. 2 and 5, the back door 43 of the camera is provided with a positioning projection 44 which enters the P-recess 37a or the F-recess 37b through the opening 38 shown in FIG. 4.

With reference to FIGS. 3A, 3B and 6, both or either of the masking plates 4 and 6 has an LCD 49 for recording such data on the film as the date and time of exposure, exposure conditions such as f-number, shutter speed and the like, and/or a message. Beneath the LCD 49 is disposed a light-emitting unit similar to that later described with reference to FIG. 11. In FIG. 3A illustrating the position of the masking plates 4 and 6 and the plate actuating mechanism 20 for full size photography, a rod 35 formed on the top of the coupling portion 33 is in contact with the upper surface of the rear end 22a of the drive lever 22. Contact therebetween is maintained by the biasing force of the charge spring 24 as illustrated in FIGS. 3A and 3B.

With reference to FIG. 4, a film take-up chamber 16 and a film supply chamber 18 are formed in the camera body on the opposite lateral sides of the exposure aperture 2. The film contained in a film cassette (not shown) is transported from the film supply chamber 18 to the film take-up chamber 16, the film then covering the exposure aperture 2.

With reference to FIG. 5, the positioning projection 44 is provided with inclined surfaces 44a between which a tapered end is formed. The bridge between the arresting recesses 37a and 37b is provided with inclined surfaces 37c forming a tapered end. In this way, even when the positioning projection 44 is somewhat misaligned from the arresting recesses 37a and 37b, the operation of closing the back door 43 will bring the inclined surfaces 44a into contact with the inclined surfaces 37c to insert the positioning projection 44 into the selected one of the arresting recesses 37a and 37b by an adjustive sliding of the operating member 31.

In FIGS. 2 and 6, it can be seen that a guide groove 45 is formed on the lateral surface of the movable lens mount 12 from its rear end to its middle. The location of the guide groove 45 is such that the pin 27 of the lower lever 26 enters the guide groove 45 when the masking plates 4 and 6 are swung to the position for panoramic photography. An upper side 45a of the entrance of the guide groove 45 is chamfered or rounded, whereby the pin 27 is guided into the guide groove 45.

Figure 7:
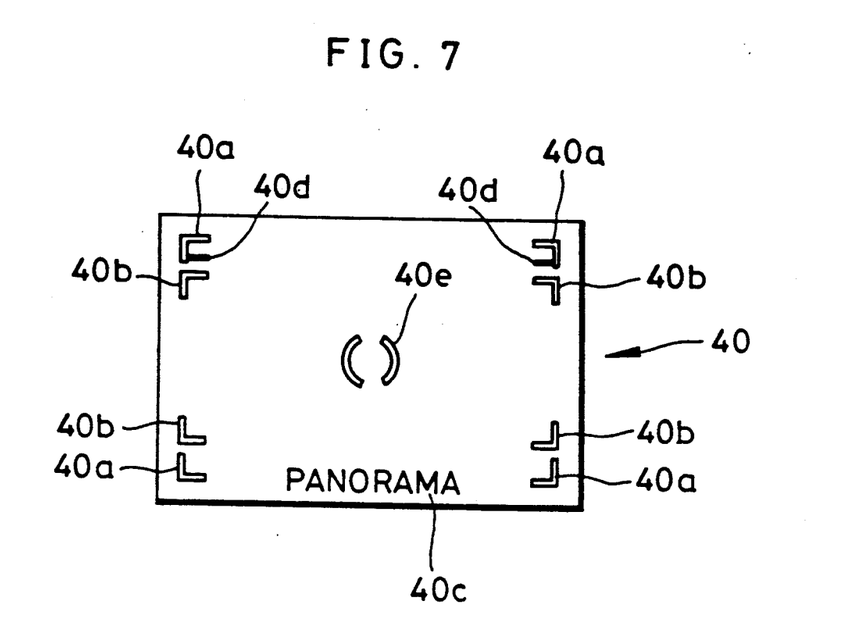
FIG. 7 is an explanatory view illustrating field frames of the viewfinder illustrated in FIG. 4.

In FIG. 7 illustrating an arrangement for indicating the panoramic photography mode in the viewfinder 40, the viewfinder 40 is constructed to indicate an F-field frame 40a for full size photography and a P-field frame 40b for panoramic photography. It is preferred that the field frame 40a or 40b can light up according to the mode selected for photography: the F-field frame 40a lights up when full size photography is selected; and the P-field frame 40b lights up when panoramic photography is selected. An indicator 40c for displaying a legend such as PANORAMA in the viewfinder 40 may also be provided, which lights up when panoramic photography is selected. The viewfinder 40 may also have a field frame 40d for close-up photography and a range finding area mark 40e.

Figure 8:
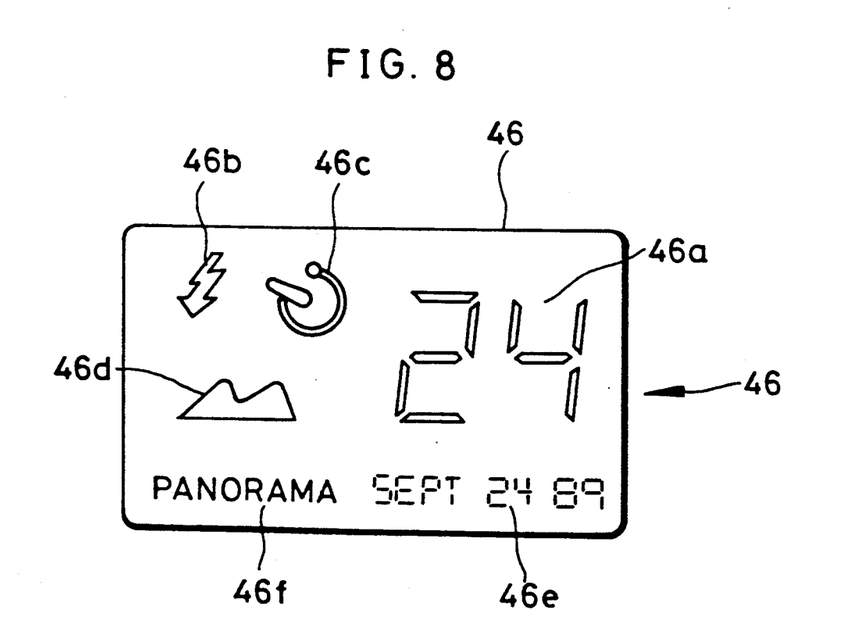
FIG. 8 is an explanatory view illustrating indicia displayed by the liquid crystal display panel illustrated in FIG. 4.

In FIG. 8 illustrating the indicator LCD 46 provided on the upper surface of the camera, the indicator LCD 46 is provided with an exposable frame number indicator 46a, a flash mode indicator 46b, a self photography mode indicator 46c, a far distance mode indicator 46d, a date indicator 46e, and also a panoramic mode indicator 46f. When panoramic photography is selected, the panoramic mode indicator 46f lights up to indicate the same.

It is preferred to provide an indicator switch actuable by the operating member 31 so that the slide of the operating member 31 can actuate the P-field frame 40b and the indicator 40c in the viewfinder 40, and the panoramic mode indicator 46f. In addition to the indications for panoramic photography as illustrated in FIGS. 7 and 8, the operating member 31 has the indicia 39a and 39b so that the indicator window 41 indicates full size or panoramic photography.

Figure 9A:
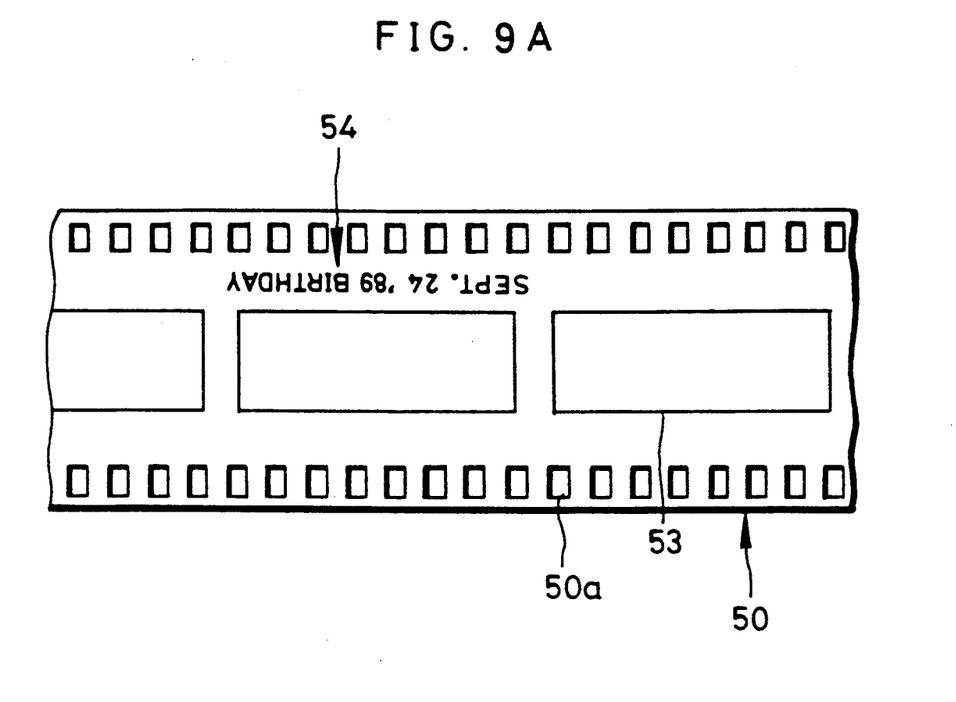
Figure 9B:
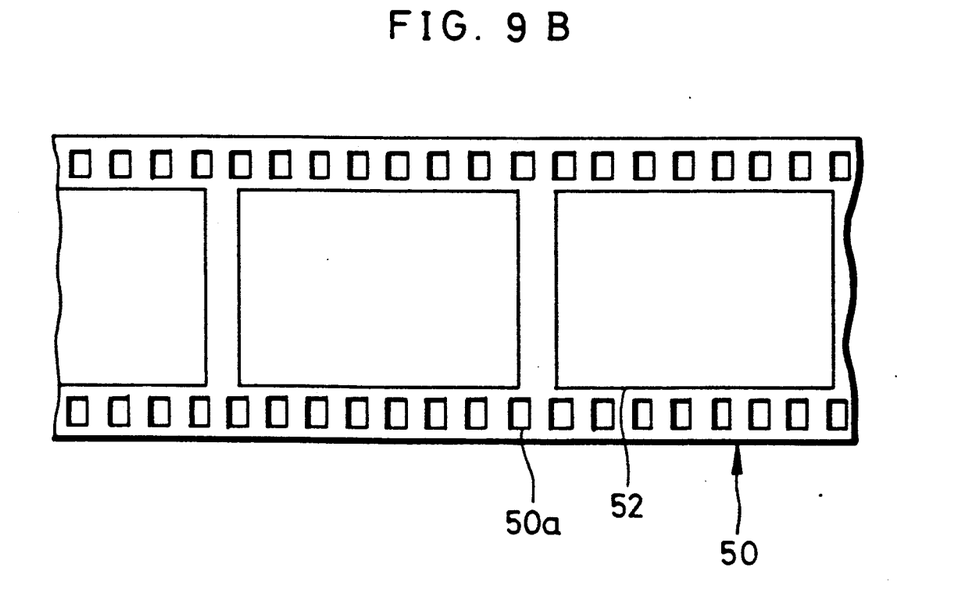

In FIGS. 9A and 9B illustrating exposed film 50, the film 50 has a predetermined number of successive frames which will be either panoramic size frames 53 in FIG. 9A or full size frames 52 in FIG. 9B. When panoramic photography is carried out, the area corresponding to a full size frame 52 outside the panoramic size frame 53 constitutes unexposed areas in which predetermined data 54 are to be recorded.

The operation of the panoramic camera thus constituted will now be described. Either full size or panoramic photography is selected by operating the operating knob 36 before the film is loaded in the camera. Once the film is loaded, the operating knob 36 is covered by the film so that the selected mode of photography is prevented from changing until all exposures of the film are completed.

Even if the operating knob 36 were incompletely operated to be in an intermediate position between the full size and panoramic positions, the operation of closing the back door 43 would cause the most nearly positioned mode to be selected. When the operating knob 36 is intermediately located, both the P-recess 37a and the F-recess 37b appear incompletely in the opening 38. In FIG. 5 where the bridge between the arresting recesses 37a and 37b registers with the opening 38, the positioning projection 44 formed on the back door 43 is brought in contact with the bridge upon closing the back door 43. With the back door 43 closed, one of the inclined surfaces 44a of the positioning projection 44 is in contact with one of the inclined surfaces 37c corresponding to one of the arresting recesses 37a and 37b so as to slide the operating member 31 upward or downward. The positioning projection 44 is thus inserted, so that the operating member 31 is reliably positioned for either full size or panoramic photography. Wide angle photography or telephotography is selected by operating the selector button 48 in accordance with the subject image in both the full size photography mode and the panoramic photography mode.

Referring now to the full size photography mode, the masking plates 4 and 6 are swung forward to an opening position with their edges spaced from the exposure aperture 2 as is illustrated in FIG. 3A, and are retracted from the optical path to passage of the light from the taking lens through the exposure aperture 2 to the film. An image can be recorded on a full size frame 52 as illustrated in FIG. 9B. In the full size photography mode, the engagement projection 34 of the operating member 31 engages with the F-notch 14a while the indicator window 41 shows the F-indicium 39b. The full size photography mode is thus indicated in the indicator window 41 on the back of the camera.

The edges of the masking plates 4 and 6 are swung to the forward position for full size photography. When the movable lens mount 12 of the taking lens is collapsed into the fixed lens mount 8 of the camera body for carrying, the retraction of the movable lens mount 12 causes the masking plates 4 and 6 to swing from the position illustrated in FIGS. 3A and to cover partly the exposure aperture 2 as illustrated in FIG. 3B so as to permit retraction of the movable lens mount 12. Specifically, during the retraction of the movable lens mount 12, the upper end 45a of the entrance of the guide groove 45 formed on the movable lens mount 12 abuts the pin 27 formed on the lower lever 26. A further retraction of the movable lens mount 12 presses the pin 27 downward in contact with 45a, and then inserts the pin 27 in the guide groove 45. Upon pressing down the pin 27, the lower lever 26 swings counterclockwise in FIG. 3A around the shaft 25 against the biasing force of the restoration spring 28. The lower end 26c of the lower lever 26 swings counterclockwise to swing the lower masking plate 6 clockwise around the shaft 6a against the biasing force of the restoration spring 30. With the lower lever 26 actuated, its upper end 26a is swung and with it the pin 26b thereon. The upper lever 23 having the groove 23d engaging with the pin 26b is swung clockwise around the shaft 21. The rear end 23a of the upper lever 23 is swung clockwise to swing the upper masking plate 4 counterclockwise around the shaft 4a against the biasing force of the restoration spring 29. Although the edges of the masking plates 4 and 6 have taken a position within the path of retraction of the movable lens mount 12 as illustrated in FIG. 6, the swinging movement of the masking plates 4 and 6 retracts the to a position in which they do not impede the movable lens mount 12, as illustrated in FIG. 3B. In spite of the condition of the plate actuating mechanism 20 illustrated in FIG. 3B, the position of the rod 35 is still kept as illustrated in FIG. 3A.

When the collapsed movable lens mount 12 is again extended with the pin 27 disengaged from the guide groove 45, the biasing force of the restoration spring 28 restores the lower lever 26 from the position illustrated in FIG. 3B to that illustrated in FIG. 3A. The lower masking plate 6 released by the restoration of the lower lever 26 is restored to the position illustrated in FIG. 3A by the biasing force of the restoration spring 30. Since the restoration of the lower lever 26 swings the upper lever 23 around the shaft 21 to the position illustrated in FIG. 3A, and the upper plate 4 is restored to the position illustrated in FIG. 3A by the biasing force of the restoration spring 29. The restored masking plates 4 and 6 make full size photography possible.

The operation with panoramic photography selected will next be described. Upon sliding the operating knob 36 downward to select the panoramic photography mode, the operating member 31 is slid downward to engage the engagement projection 34 with the P-notch 14b. With the operating member 31 slid, the rod 35 presses down the rear end 22a of the drive lever 22 from the position illustrated in FIG. 3A to that illustrated in FIG. 3B, and swings the drive lever 22 clockwise around the shaft 21. Since the charge spring 24 connects the front end 22b of the drive lever 22 to the front end 23b of the upper lever 23, the clockwise swinging of the drive lever 22 stretches the charge spring 24 and swings the upper lever 23 clockwise through the biasing force of the charge spring 24. The swinging of the upper lever 23 swings the upper masking plate 4 counterclockwise against the biasing force of the restoration spring 29 in contact with the rear end 23a of the upper lever 23.

With the upper lever 23 thus swung, the lower lever 26 having the pin 26b inserted in the groove 23d is swung counterclockwise around the shaft 25 against the biasing force of the restoration spring 28. In contact with the lower end 26c of the lower lever 26, the lower masking plate 6 is swung clockwise against the biasing force of the restoration spring 30.

The upper and lower masking plates 4 and 6 are swung closed to cover the upper and lower portions of the exposure aperture 2 as illustrated in FIG. 3B. The upper and lower portions of the film are shielded from the light passing through the taking lens during exposure, and are thus prevented from being exposed. Unexposed portions are formed as illustrated in FIG. 9A so as to obtain a film 50 having only panoramic size frames 53. In the condition illustrated in FIG. 3B, the lowered rod 35 and the biasing charge spring 24 press the upper and lower masking plates 4 and 6 against the exposure aperture 2. Therefore, the masking plates 4 and 6 reliably shield the two horizontal portions from light passing through the taking lens.

With the panoramic photography mode selected, the operating member 31 is slid down to show the P-indicator 39a in the indicator window 41 for the visual recognition of the panoramic photography mode. Since the masking plates 4 and 6 are closed in the panoramic photography mode, the recorder LCD 49 for recording data provided on the masking plates 4 and 6 faces the upper and lower unexposed portions of the film. The recorder LCD 49 records the desired data 54 such as the date, time, conditions and/or a message, on the unexposed portions of the film at the time of the shutter releasing operation. Since the data 54 do not always need to be recorded, judgment as to recordation of the data 54 is made by activating the switch 42 upon sliding the operating member 31 until it engages the engagement projection 34 with the E-notch 14c.

In order to change from panoramic photography to full size photography, the operating knob 36 is shifted upward when the camera is empty and the back door is open. The rod 35 of the operating member 3 is shifted from the position illustrated in FIG. 3B to that in FIG. 3A. The drive lever 22 and thus the upper lever 23 are released to allow the restoration spring 29 to swing the upper masking plate 4 clockwise. The upper lever 23 is swung counterclockwise. By means of the engagement between the groove 23d and the pin 26b, the swinging of the upper lever 23 swings the lower lever 26 clockwise around the shaft 25 so as to release the positioned lower masking plate 6. The biasing force of the restoration spring 30 swings the lower masking plate 6 counterclockwise around the shaft 6a up to the position illustrated in FIG. 3A. The masking plates 4 and 6 are swung to the positions shown in FIG. 3A for full size photography.

It is to be noted that, although the present embodiment has an indicator window 41 and indicia 39a and 39b, an LED indicator may instead be provided, adapted to be actuated during panoramic photography upon the operation of the shutter release button. The recorder LCD 49 is provided on the masking plates 4 and 6, but may be provided on the back door 43. In order to meet requirements to record certain data within the printed picture frame, e.g. the date of the photograph, two recorder LCDs may be provided for the full size and the panoramic size, of which the recorder LCD 49 for the panoramic size is actuate din the panoramic photography mode, and a recorder LCD for the full size is actuate din the full size photography mode. It is preferred that the changeover of the recorder LCDs be carried out upon sliding the operating member 31.

Although the operating knob 36 is provided in the film passageway in the camera, it may be provide don the outside of the camera instead. Although a judgment as to recording the data 54 is made by activating the switch 42, a manual switch may instead be provided on the camera body to be operated for making this judgment.

It is to be noted that, although the panoramic camera according to the present embodiment has a vari-focal lens changeable between two focal lengths with a converter lens inserted into or retracted from the optical path, it may instead have a zoom lens continuously changeable as to focal length.

Although the camera according to the present embodiment is used for taking photographs of panoramic size by covering two horizontal portions of the picture frame, only one horizontal portion, either upper or lower, may instead be covered.

Figure 10:
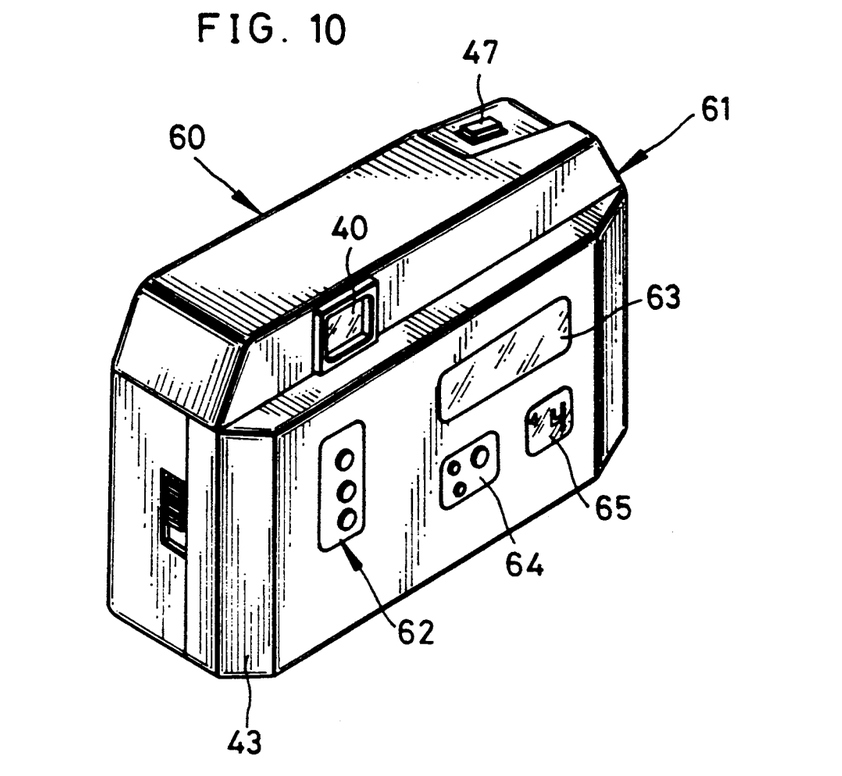
FIG. 10 is a perspective view illustrating a construction of a panoramic camera according to another preferred embodiment of the present invention.

FIG. 10 illustrates a panoramic camera 60 observed from behind according to another embodiment of the present invention. Elements similar to those illustrated in FIG. 1 are designated by the same reference numerals. At the left of the back door 43, a data selector panel 62 is provided for selecting data to be recorded on the film 50 during panoramic photography. The data selector panel 62 has selector buttons A to C (FIG. 12) operable to select and record desired data on the film 50, e.g. the date or the conditions of photography. Specifically, the actuation of button A selects the date mode for recording the date or time; the actuation of button B selects the conditions mode for recording such data as the f-number and shutter speed; and the actuation of button C selects the message mode for recording a message such as "BIRTHDAY" or "CONGRATULATIONS".

A data indicating LCD 63 is provided on the back door 43 for indicating data corresponding to the operated one of the selector buttons A to C, i.e. data to be recorded on the film 50. There is provided an operation panel 64 having a flash button, a rewinding button and a self timer button under the data indicating LCD 63, and a mode indicating LCD 65 for indicating the number of exposable frames and the flash mode beside the operation panel 64.

Figure 11:
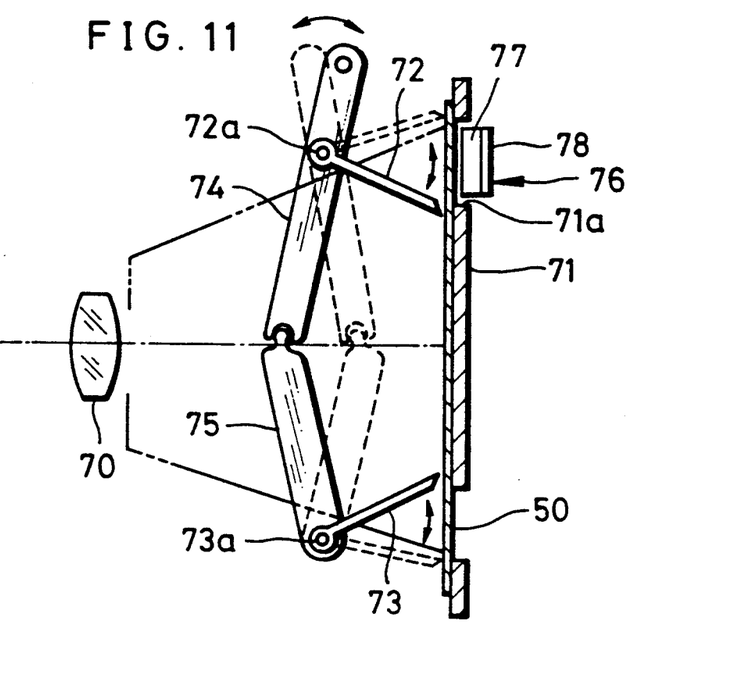
FIG. 11 is a side view of a masking plate actuating mechanism provided in the camera illustrated in FIG. 10.

FIG. 11 illustrates the inside of the camera, particularly the masking plate actuating mechanism. Reference numeral 70 designates the taking lens, and 71 designates a pressure plate for contacting the back of the film 50 to keep the film flat in a position for exposure. In front of the transported film 50, masking plates 72 and 73 are swingably mounted on shafts 72a and 73a for defining the picture frame. The masking plates 72 and 73 occupy the positions indicated by broken lines in the full size photography mode, and are moved to the positions indicated in solid lines in the panoramic photography mode to intercept the upper and lower portions of light that would otherwise fall on the film 50.

The masking plates 72 and 73 are driven by two drive levers 74 and 75 fixed thereto. Upon moving the upper end of the drive lever 74 forward or backward, the drive levers 74 and 75 swing about the shafts 72a and 73a to swing the masking plates 72 and 73. In the viewfinder, there are provided field frames for full size photography and panoramic photography switched electrically or mechanically in accordance with positions taken by the masking plates 72 and 73.

A data recording unit 76, which is disposed above and behind the position for exposing the film 50 for recording the data described above, is mounted on the back door 43, is fitted in an opening 71a of the pressure plate 71, consists of a recorder LCD 77 and an electroluminescent lamp (EL lamp) 78 of a thin type, and has a length substantially the same as the horizontal width of the picture frame of the film 50 so as to cause to be recorded predetermined data simultaneously from behind the film 50.

Figure 12:
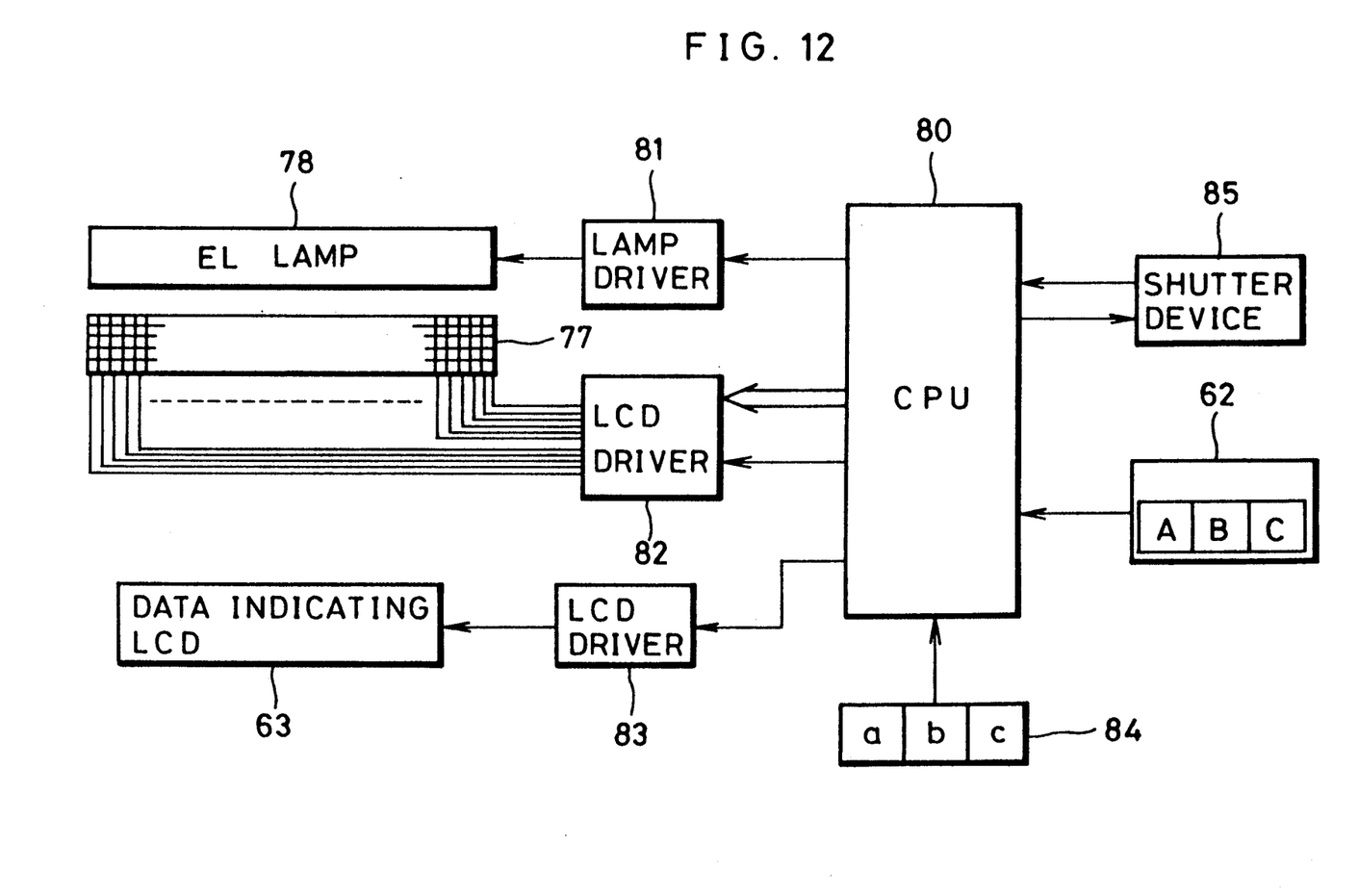
FIG. 12 is a block diagram illustrating the control circuit of the embodiment in FIG. 10.

The construction of the data recording unit 76 will now be described with reference to FIG. 12. A CPU 80 for controlling the overall operation of the camera drives the EL lamp 78 and the recorder LCD 77 through a lamp driver 81 and an LCD driver 82, and also drives the data indicator LCD 63 through an LCD driver 83 to indicate on the data indicator LCD 63 the data to be recorded on the film 50. Upon receipt of a data signal supplied from the data selector panel 62 to the CPU 80, corresponding data previously stored in a memory 84 are read out in accordance with the data signal so as to drive the data indicator LCD 63 and the recorder LCD 77. The CPU 80 is connected also to a shutter device 85 to drive the EL lamp 78 upon operating the shutter.

The operation of this second embodiment will now be described. Before starting to use the camera, either the full size photography mode or the panoramic photography mode is selected with the back door 43 of the camera 60 open. Upon selecting the panoramic photography mode, the masking plates 72 and 73 are inserted into the optical path to mask the upper and lower portions of the picture frame on the film 50. If it is desired to record selected data on the film 50, one of the selector buttons A to C on the data selector panel 62 is selected and pressed in accordance with the desired data. Both the recorder LCD 77 and the data indicator LCD 63 indicate the selected data.

When the shutter release button 47 is pressed, a signal from the shutter device 85 is supplied to the CPU 80, which drives the EL lamp 78 through the lamp driver 81 to emit light. Upon actuating the EL lamp 78, the data 54 of "SEPT. 24 '89 BIRTHDAY" indicated on the recorder LCD 77 as illustrated in FIG. 9A are recorded on the upper portion of the rear surface of the film 50 upside down and reversed. Accordingly, the occasion on which the frame was exposed can be visually recognized after developing the film 50. The recorded data can also be indicated on photographic paper if the film 50 is printed in a manner similar to full size photography.

Although the data recording unit 76 is fixed in position in this embodiment, it may be constructed to be vertically movable so that the desired data can be recorded even in the full size photography mode on a portion close to the edge of the picture frame wherein the subject image is recorded.

Figure 13:
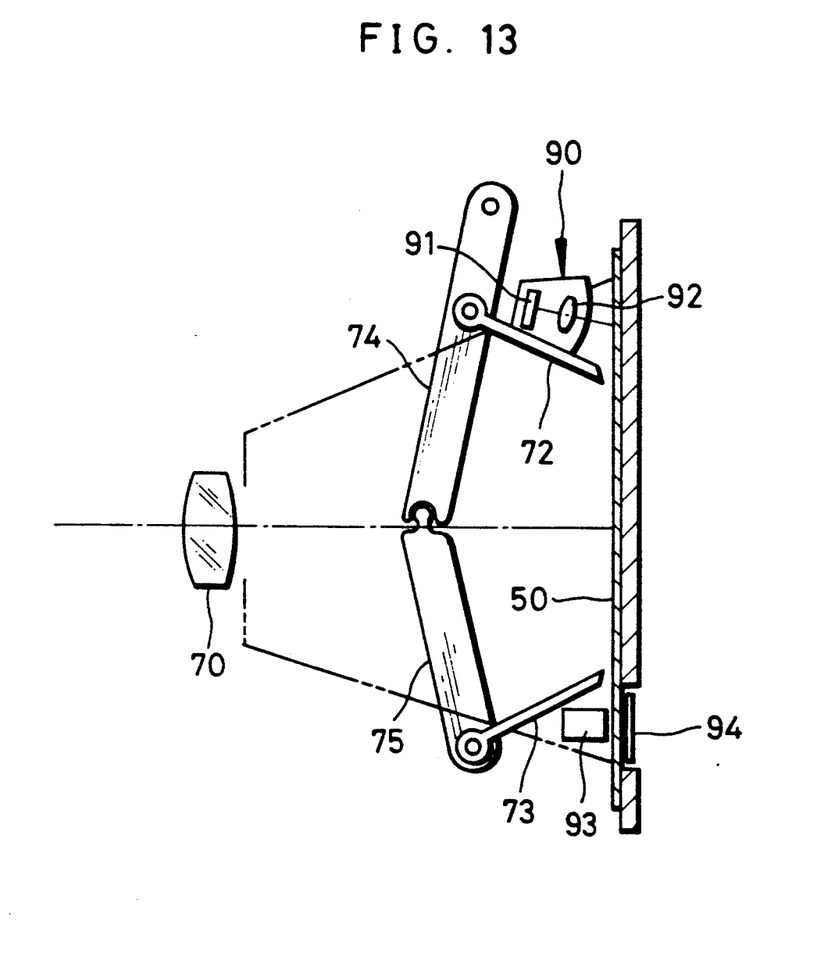
FIG. 13 is a sectional view similar to FIG. 11 but illustrating the construction of still another preferred embodiment of the present invention.

FIG. 13 illustrates still another embodiment, wherein the data 54 are recorded on the front surface of the film 50. A data recording unit 90 is disposed on the masking plate 72 in front of the film 50. The data recording unit 90 consists of light-emitting diodes (LEDs) 91 and a lens 92. The LEDs 91 arranged in a vertical column emit light which is focused by the lens 92, and expose the film 50 from one side to another side of the frame at a speed corresponding to that of advance of the film 50. When the advance of the film 50 is completed, a series of data is recorded onto the film 50.

In order to expose the film 50 following film advance, a reflection-type perforation sensor 93 is disposed on the lower portion of the film 50 for detecting the perforations 50a. The perforation sensor 93 inspects the edges of the perforations 50a by means of a reflective plate 94 for reflecting light, and detects the beginning of advance of the film 50.

Although the data recording mechanism according to these embodiments is incorporated in a camera changeable between full size or the panoramic size, the mechanism may also be used for a camera with the picture frame fixed at panoramic size.

It is to be noted that the camera may be constructed such that wide angle photography may be automatically selected upon selecting panoramic photography. Conversely, the camera may be constructed such that panoramic photography is automatically selected upon selecting wide angle photography by operating the focal length changeover button 48. In this case, the retraction of the movable lens mount 12 to the wide angle photographic position causes the rear end of mount 12 to press the masking plates 4 and 6 until they cover the exposure aperture 2 for panoramic photography.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A photographic camera comprising:
   a rectangular exposure aperture for forming a picture frame of full size;
   masking means for selectively partly masking said exposure aperture so as to form a picture frame of a panoramic size which is vertically reduced from said full size when said masking means is set in a panoramic position and for opening the whole said exposure aperture when said masking means is set in a full size position;
   actuating means for setting said masking means selectively in either said full size position or said panoramic position; and
   manual operating means for operating said actuating means.

2. A photographic camera as defined in claim 1, wherein said masking means includes a first masking plate for masking an upper portion of said exposure aperture and a second masking plate for masking a lower portion of said exposure aperture.

3. A photographic camera as defined in claim 2, wherein said masking plates are swung about horizontal shafts parallel to sides of said exposure aperture.

4. A photographic camera as defined in claim 3, further comprising:
   a taking lens assembly having a movable lens mount and a fixed lens mount into which said movable lens mount is substantially retractable;
   engagement means formed integrally with said manual operating means; and an engagement portion formed on said movable lens mount for engaging with said engagement means upon retracting said movable lens mount into said fixed lens mount so as to set said masking plates in said panoramic position.

5. A photographic camera as defined in claim 3, further comprising:
spring members for biasing said masking plates toward said full size position.

6. A photographic camera as defined in claim 3, which further comprises a taking lens assembly having a movable lens mount and a fixed lens mount into which said movable lens mount is substantially retractable, and wherein said actuating means is positioned on said fixed lens mount.

7. A photographic camera as defined in claim 3, further comprising:
means for indicating the size of the picture frame upon operating said manual operating means.

8. A photographic camera as defined in claim 3, wherein said manual operating means is disposed in a passageway for film to be loaded in a body of said camera.

9. A photographic camera as defined in claim 3, wherein said manual operating means is disposed on the outside of a body of said camera for being externally operated.

10. A photographic camera as defined in claim 1, further comprising:
a slide lever portion provided slidably along a back door of a body of said camera for being operated by said manual operating means;
arresting means formed on said slide lever portion for arresting said slide lever portion in said full size position or in said panoramic position; and
positioning means formed on said back door for engaging with said arresting means upon closing said back door so as to prevent said slide lever portion from sliding, thereby to prevent said masking means from changing position.

11. A photographic camera as defined in claim 10, wherein said positioning means is a projection member having an advancing inclined surface on its end; and said arresting means are recesses having receiving inclined surfaces engageable with said advancing inclined surface at their inlets for receiving said projection member and for causing said slide lever portion to slide to a position in which said projection member can enter one of said recesses.

12. A photographic camera as defined in claim 1, further comprising:
means for recording predetermined data on film loaded in a body of said camera on a portion of said film masked by said masking means.

13. A photographic camera as defined in claim 12, wherein said data recording means is disposed on a surface of said masking means facing said film.

14. A photographic camera as defined in claim 13, wherein said data recording means includes a liquid crystal display panel and a light-emitting unit.

15. A photographic camera as defined in claim 13, wherein said data recording means includes a light-emitting diode and a lens.

16. A photographic camera as defined in claim 12, wherein said data recording means is disposed on a back door of said camera body for recording said data from behind said film.

17. A photographic camera as defined in claim 16, wherein said data recording means includes a liquid crystal display panel and an electroluminescent lamp.

18. A photographic camera comprising:
a taking lens assembly having a movable lens mount and a fixed lens mount into which said movable lens mount is substantially retractable;
a rectangular exposure aperture for forming a picture frame of full size;
a first masking plate for masking an upper portion of said exposure aperture and a second masking plate for masking a lower portion of said exposure aperture in order to form a picture frame of a panoramic size which is vertically reduced from said full size when said masking plates are set in a panoramic position, said first and second masking plates being swingable about horizontal shafts parallel, to sides of said exposure aperture for opening the whole of said exposure aperture when said masking plates are set in a full size position;
actuating means for setting said masking plates selectively in either said full size position or said panoramic position;
manual operating means for operating said actuating means;
engagement means formed integrally with said manual operating means; and
an engagement portion formed on said movable lens mount for engaging with said engagement means upon retracting said movable lens mount into said fixed lens mount so as to set said masking plates in said panoramic position.

19. A photographic camera comprising:
a rectangular exposure aperture for forming a picture frame of full size;
a first masking plate for masking an upper portion of said exposure aperture and a second masking plate for masking a lower portion of said exposure aperture in order to form a picture frame of a panoramic size which is vertically reduced from said full size when said masking plates are set in a panoramic position, said first and second masking plates being swingable about horizontal shafts parallel to sides of said exposure aperture for opening the whole said exposure aperture when said masking plates are set in a full size position;
actuating means for setting said masking plates selectively in either said full size position or said panoramic position;
manual operating means for operating said actuating means; and
spring means biasing said masking plates toward said full size position.

20. A photographic camera comprising:
a taking lens assembly having a movable lens mount and a fixed lens mount into which said movable lens mount is substantially retractable;
a rectangular exposure aperture for forming a picture frame of full size;
a first masking plate for masking an upper portion of said exposure aperture and a second masking plate for masking a lower portion of said exposure aperture in order to form a picture frame of a panoramic size which is vertically reduced from said full size when said masking plates are set in a panoramic position, said first and second masking plates being swingable about horizontal shafts parallel to sides of said exposure aperture for opening the whole said exposure aperture when said masking plates are set in a full size position;

actuating means provided on said fixed lens mount for setting said masking plates selectively in either said full size position or said panoramic position; and manual operating means for operating said actuating means.

21. A photographic camera comprising:

a rectangular exposure aperture for forming a picture frame of full size;

a first masking plate for masking an upper portion of said exposure aperture and a second masking plate for masking a lower portion of said exposure aperture in order to form a picture frame of a panoramic size which is vertically reduced from said full size when said masking plates are set in a panoramic position, said first and second masking plates being swingable about horizontal shafts parallel to sides of said exposure aperture for opening the whole said exposure aperture when said masking plates are set in a full size position;

actuating means for setting said masking plates selectively in either said full size position or said panoramic position;

manual operating means for operating said actuating means; and means for indicating the size of the picture frame upon operating said manual operating means.

22. A photographic camera as defined in claim 21, wherein said manual operating means is disposed in a passageway for film to be loaded in a body of said camera.

23. A photographic camera as defined in claim 21, wherein said manual operating means is disposed on the outside of a body of said camera for being externally operated.

24. A photographic camera comprising:

a rectangular exposure aperture for forming a picture frame of full size;

a first masking plate for masking an upper portion of said exposure aperture and a second masking plate for masking a lower portion of said exposure aperture in order to form a picture frame of a panoramic size which is vertically reduced from said full size when said masking plates are set in a panoramic position, said first and second masking plates being swingable about horizontal shafts parallel to sides of said exposure aperture for opening the whole said exposure aperture when said masking plates are set in a full size position;

actuating means for setting said masking plates selectively in either said full size position or said panoramic position;

manual operating means for operating said actuating means;

a slide lever portion provided slidably along a back door of a body of said camera for being operated by said manual operating means;

arresting means formed on said slide lever portion for arresting said slide lever portion in said full size position or in said panoramic position; and positioning means formed on said back door for engaging with said arresting means upon closing said back door so as to prevent said slide lever portion from sliding, thereby to prevent said masking plates from changing position.

25. A photographic camera as defined in claim 24, wherein said positioning means is a projection member having an advancing inclined surface on its end; and said arresting means are recesses having receiving inclined surfaces engageable with said advancing inclined surface at their inlets for receiving said projection member and for causing said slide lever portion to slide to a position in which said projection member can enter one of said recesses.

26. A photographic camera comprising:

a rectangular exposure aperture for forming a picture frame of full size;

masking means for selectively partly masking said exposure aperture so as to form a picture frame of a panoramic size which his vertically reduced from said full size when said masking means is set in a panoramic position and for opening the whole said exposure aperture when said masking means is set in a full size position;

actuating means for setting said masking means selectively in either said full size position or said panoramic position;

manual operating means for operating said actuating means; and means for recording predetermined data on film loaded in a body of said camera on a portion of said film masked by said masking means.

27. A photographic camera as defined in claim 26, wherein said data recording means is disposed on a surface of said masking means facing said film.

28. A photographic camera as defined in claim 27, wherein said data recording means includes a liquid crystal display panel and a light-emitting unit.

29. A photographic camera as defined in claim 27, wherein said data recording means includes a light-emitting diode and a lens.

30. A photographic camera as defined in claim 26, wherein said data recording means is disposed on a back door of said camera body for recording said data from behind said film.

31. A photographic camera as defined in claim 30, wherein said data recording means includes a liquid crystal display panel and an electroluminescent lamp.

* * * * *

Adverse Decisions In Interference

Patent No. 5,086,311, Yoji Naka, Akio Ohmiya, PANORAMIC CAMERA, Interference No. 103,465, final judgment adverse to the patentees rendered April 16, 1997, as to claims 1-3, 5-17, 19-21, 23 and 26-31.

*(Official Gazette October 27, 1998)*